Sept. 20, 1927.
T. M. CAMPOS
1,642,941
TRAFFIC SIGNAL FOR AUTOMOBILES
Filed Feb. 4, 1926     2 Sheets-Sheet 1
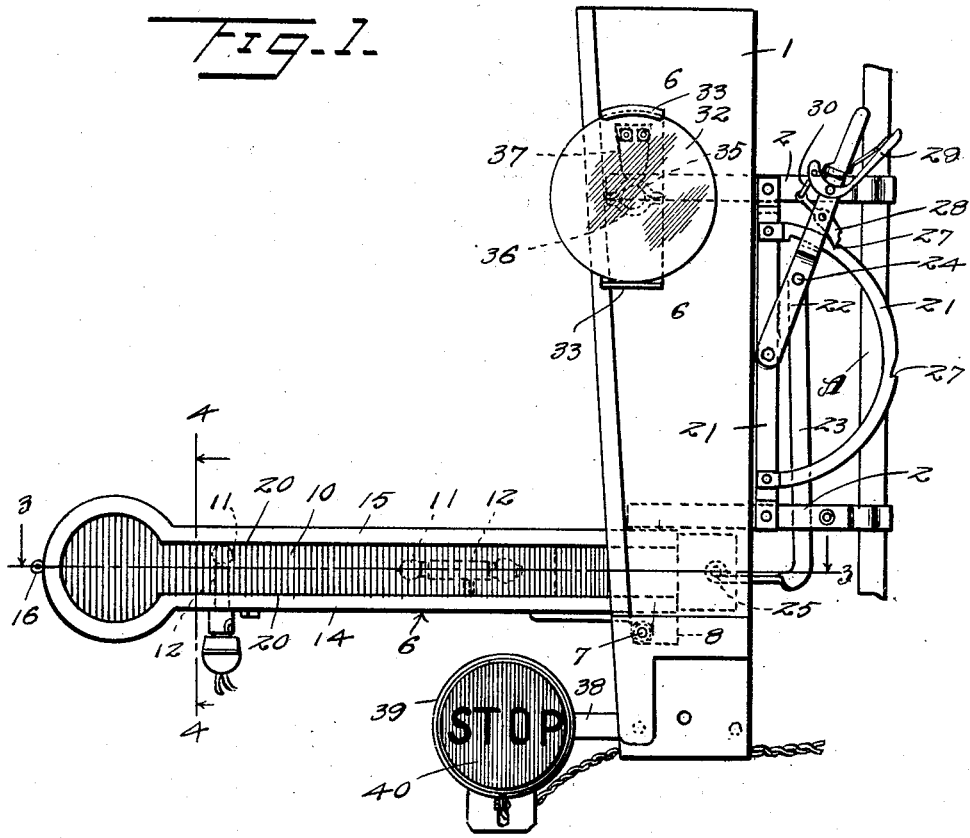
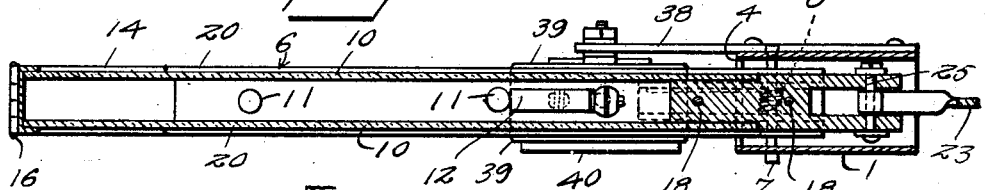
Inventor
T. M. Campos.
By
Attorney

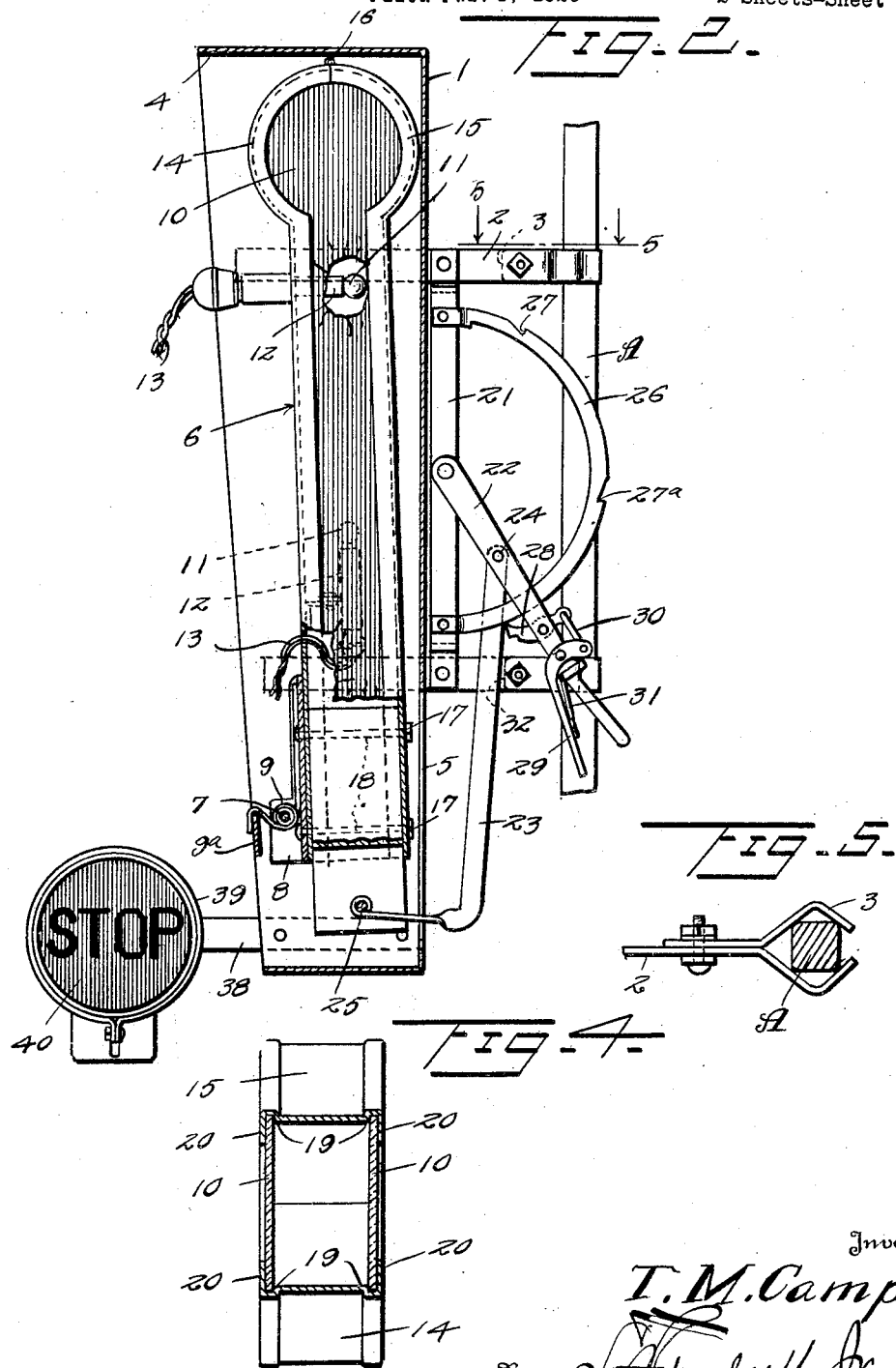

Patented Sept. 20, 1927.

1,642,941

UNITED STATES PATENT OFFICE.

THOMAS M. CAMPOS, OF LOS ANGELES, CALIFORNIA.

TRAFFIC SIGNAL FOR AUTOMOBILES.

Application filed February 4, 1926. Serial No. 85,984.

The invention relates to signals designed to be mounted on automobiles and operable by the driver to indicate to drivers of other automobiles the intention of the driver and has for its principal object the provision of an accessory that is quickly applied to the automobile and is effective in operation, comprising a casing containing a signal arm that is mounted to be housed within the casing and to be projected therefrom to signaling position by means of an operating lever connected with the signaling arm by means of an operating arm, the casing being provided with slots through which the arm is projected and the operating arm extends.

The invention will be described in detail hereinafter and will be found illustrated in the accompanying drawings, in which Figure 1 is a side view in elevation of the improved traffic signal showing it attached to a windshield post.

Figure 2 a view on an enlarged scale, the casing being shown in vertical section, and the signaling arm being shown in its three positions, Figure 3, a longitudinal sectional view of the signal arm and the housing therefor on a plane indicated by the line 3—3 of Figure 1, Figure 4, a transverse sectional view on a plane indicated by the line 4—4 of Figure 1, Figure 5, a detail sectional view on a plane indicated by the line 5—5 of Figure 1; and Figure 6, a fragmental sectional view on a plane indicated by the line 6—6 of Figure 1.

In the drawings, similar reference characters will be used to designate corresponding parts throughout the several views.

The automobile accessory comprises a housing 1 having arms 2 secured thereto and provided with clamping members 3 to engage a windshield post A. The outer wall of the housing 1 is formed with an elongated slot or opening 4 and the inner wall with a slot or opening 5. A semaphore arm 6 is pivotally mounted in the housing 1 by means of a pivot pin 7 engaging the front and rear walls of the housing 1, 8 indicating ears on the semaphore arm 6 that pivotally engage said pin 7. A spring 9 is coiled around pin 7 and has one of its ends engaging semaphore arm 6 and its other end a cross bar 9ª connecting the front and rear walls of housing 1, and normally tending to hold the arm 6 in upright position as shown in Figure 2. The semaphore arm 6 is preferably made hollow and provided with transparent panels 10 front and rear, that may be colored red or any other distinctive color and the interior of the arm may be illuminated in any suitable manner, such for instance as by electric lamps 11 carried by sockets 12 and supplied from any suitable source of electric power by means of wires 13.

For convenience in replacing the electric lamps 11, and also the transparent panels 10; the upper and lower walls of semaphore arm 6 is made in two pieces, designated 14 and 15, hingedly secured together at the free end of the arm, as shown at 16. The upper wall 15 is adapted to be swung on the hinge 16 after removal of the nuts 17 from bolts 18 that hold said wall in a closed position.

The walls 14 and 15 are shaped to provide grooves 19, to receive the edges of panels 10, and inturned flanges 20 defining frames for said panels.

Secured to the arm 2 is a bar 21 on which is fulcrumed an operating lever 22, and 23 indicates an L-shaped operating arm connecting lever 22 and the semaphore arm 6, being pivotally connected with said members as shown at 24 and 25, respectively. 26 indicates a segment secured at its ends to the bar 21 and provided with notches 27 and 27ª in which a detent 28 carried by lever 22 is adapted to seat to hold the semaphore arm 6 in adjusted positions, the detent 28 being operated by a hand lever 29 fulcrumed on lever 22 and connected to detent 28 by means of a link 30, 31 indicating a spring to retract said lever and hold the detent in engagement with the segment 26, normally.

It will be understood that spring 9 normally holds the semaphore arm 6 inclosed within housing 1 in a non-signaling position. When it is desired to indicate that the vehicle on which the signal is installed is about to stop or slow down the operator by moving the lever 22 upwardly until the detent 28 engages in notch 27ª will move the semaphore arm 6 to an upwardly inclined position, while if it is desired to indicate that the vehicle is about to make a right or left turn the semaphore arm is moved to the horizontal position of Figure 1 and the detent 28 engages in notch 27 to hold the arm in said position.

A rear view mirror may be provided and secured in position on housing 1 by means disclosed in detail in Figure 6, in which the mirror is designated 32 and shown supported by clamping members 33 held in clamping position by means of a bolt 34. Clamping members 33 are formed with recessed portions 35 that collectively comprise a socket to receive a ball 36 of bracket 37 secured to said housing 1, this structure providing means by which the mirror may be adjusted at the proper angle to give the operator a view of the road behind the vehicle.

Secured to the lower portion of housing 1 is an outwardly extending arm 38 on which is a lamp casing 39 carrying a panel 40 of suitably colored glass bearing the legend "Stop" or other indication, said lamp casing being provided with any preferred means to illuminate the panel 40 and controlled in any suitable manner.

It will be also understood that any well known means to control the current to lamps 11 may also be provided, such means not being a part of the invention involved.

What is claimed is:—

1. A semaphore arm for automobile signals, comprising oppositely disposed walls hingedly engaging one another at the outer extremity of said arm, said walls having inturned flanges and grooves formed therein, transparent panels engaging in said grooves, and illuminating means carried by said arm and located within said walls and between the panels.

2. A traffic signal for automobiles, comprising a casing having an opening in one side, a semaphore arm in said casing, a pivot pin arranged transversely of the casing, ears on said semaphore arm and pivotally engaging said pivot pin to pivot the arm in the casing, a cross bar spanning the opening in the casing, a spring coiled around the pivot pin and terminally engaging the cross bar and the semaphore arm to normally hold it concealed in the casing, said cross bar forming a stop to limit the movement of the semaphore arm into signaling position, and means to move the semaphore arm into and hold it in signaling position.

In testimony whereof I affix my signature.

THOMAS M. CAMPOS.